US007013251B1

United States Patent
Nace et al.

(10) Patent No.: US 7,013,251 B1
(45) Date of Patent: Mar. 14, 2006

(54) SERVER RECORDING AND CLIENT PLAYBACK OF COMPUTER NETWORK CHARACTERISTICS

(75) Inventors: Eric W. Nace, Fairbanks, AK (US); Adam C. Stone, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/461,900

(22) Filed: Dec. 15, 1999

(51) Int. Cl.
G06F 17/50 (2006.01)
G06F 7/62 (2006.01)
G06F 13/10 (2006.01)
G06F 13/12 (2006.01)
G06F 15/173 (2006.01)

(52) U.S. Cl. ............... 703/13; 703/21; 709/223; 702/182

(58) Field of Classification Search ............... 703/21, 703/22, 23, 24, 27; 709/223, 224, 217, 218, 709/220, 221; 714/20, 31, 32, 26, 33, 37, 714/38, 47; 702/186, 182
See application file for complete search history.

(56) References Cited

U.S. PATENT DOCUMENTS

| 5,086,386 | A | * | 2/1992 | Islam ................... 707/202 |
| 5,410,681 | A | * | 4/1995 | Jessen et al. .......... 703/27 |
| 5,432,932 | A | * | 7/1995 | Chen et al. ........... 718/103 |
| 5,440,719 | A | * | 8/1995 | Hanes et al. .......... 703/21 |
| 5,483,468 | A | * | 1/1996 | Chen et al. ........... 702/186 |
| 5,506,955 | A | * | 4/1996 | Chen et al. ............. 714/26 |
| 5,553,235 | A | * | 9/1996 | Chen et al. ............. 714/26 |
| 5,600,789 | A | * | 2/1997 | Parker et al. ........... 714/38 |
| 5,640,537 | A | * | 6/1997 | Jessen et al. .......... 703/23 |
| 5,669,000 | A | * | 9/1997 | Jessen et al. .......... 717/127 |
| 5,761,486 | A | * | 6/1998 | Watanabe et al. ...... 703/21 |
| 5,809,282 | A | * | 9/1998 | Cooper et al. ......... 709/226 |
| 5,812,780 | A | * | 9/1998 | Chen et al. ........... 709/224 |
| 5,819,066 | A | * | 10/1998 | Bromberg et al. ..... 714/42 |
| 5,864,660 | A | * | 1/1999 | Hamameh et al. ..... 714/32 |
| 5,870,559 | A | * | 2/1999 | Leshem et al. ........ 709/224 |
| 5,881,219 | A | * | 3/1999 | Leung et al. .......... 714/31 |
| 5,881,237 | A | * | 3/1999 | Schwaller et al. ..... 709/224 |
| 5,881,268 | A | * | 3/1999 | McDonald et al. ..... 703/21 |
| 5,907,696 | A | * | 5/1999 | Stilwell et al. ........ 703/13 |
| 5,946,474 | A | * | 8/1999 | Skogby ................. 703/13 |

(Continued)

Primary Examiner—Paul L. Rodriguez
Assistant Examiner—Dwin M. Craig
(74) Attorney, Agent, or Firm—Lyon & Harr, L.L.P.; Craig S. Fischer

(57) ABSTRACT

A system and a method for server recording and client playback of computer network characteristics. In general, the network simulation system of the present invention includes a recording module that resides on a server and records and stores the network characteristics associated with networks sessions in a data collector file. The system also includes playback module that resides on a client receives the data collector file and plays back the data collector file upon request. The data collector file includes a log file, which is used to store initial request data, and a data file, which is used to store data other than the initial request data. The method of the present invention includes recording computer network characteristics on a recording server and playing back the recording on a client to the same or another server. The recording method of the present invention includes using a global filter residing on the server to record the network characteristics and storing the recording in a data collector file. The playback method includes receiving a data collector file containing recorded network characteristics recorded on a server and playing back the data collector file to simulate the characteristics of real-world network sessions.

34 Claims, 8 Drawing Sheets

U.S. PATENT DOCUMENTS

| | | | |
|---|---|---|---|
| 5,974,572 A * | 10/1999 | Weinberg et al. | 714/47 |
| 6,002,871 A * | 12/1999 | Duggan et al. | 717/135 |
| 6,023,773 A * | 2/2000 | O'Donnell et al. | 714/40 |
| 6,041,041 A * | 3/2000 | Ramanathan et al. | 370/241 |
| 6,044,398 A * | 3/2000 | Marullo et al. | 709/219 |
| 6,074,427 A * | 6/2000 | Fought et al. | 703/21 |
| 6,086,618 A * | 7/2000 | Al-Hilali et al. | 703/2 |
| 6,134,514 A * | 10/2000 | Liu et al. | 703/17 |
| 6,167,534 A * | 12/2000 | Straathof et al. | 714/38 |
| 6,205,413 B1 * | 3/2001 | Bisdikian et al. | 703/24 |
| 6,249,886 B1 * | 6/2001 | Kalkunte | 714/47 |
| 6,253,337 B1 * | 6/2001 | Maloney et al. | 714/38 |
| 6,286,046 B1 * | 9/2001 | Bryant | 709/224 |
| 6,304,982 B1 * | 10/2001 | Mongan et al. | 714/38 |
| 6,308,146 B1 * | 10/2001 | La Cascia et al. | 703/22 |
| 6,314,463 B1 * | 11/2001 | Abbott et al. | 709/224 |
| 6,324,492 B1 * | 11/2001 | Rowe | 703/13 |
| 6,360,332 B1 * | 3/2002 | Weinberg et al. | 714/4 |
| 6,412,015 B1 * | 6/2002 | Navare et al. | 709/250 |
| 6,434,513 B1 * | 8/2002 | Sherman et al. | 702/186 |
| 6,446,120 B1 * | 9/2002 | Dantressangle | 709/224 |
| 6,449,739 B1 * | 9/2002 | Landan | 714/47 |
| 6,526,044 B1 * | 2/2003 | Cookmeyer et al. | 370/352 |
| 6,549,944 B1 * | 4/2003 | Weinberg et al. | 709/224 |

* cited by examiner

SERVER RECORDING AND CLIENT PLAYBACK OF COMPUTER NETWORK CHARACTERISTICS

TECHNICAL FIELD

The present invention relates in general to computer network simulation and more particularly to a system and a method for server recording and client playback of computer network characteristics.

BACKGROUND OF THE INVENTION

Capacity planning of a server used in a server/client wide-area network (WAN) is quickly becoming more important as the use of WANs (such as the Internet) rapidly increase. WAN servers often are used by Internet sites and must be able to efficiently handle the anticipated requests to the site. Capacity planning helps predict if and when system saturation will occur by testing the maximum user load and speed of the target server. Thus, accurate and realistic testing a server is a crucial foundation for building a network system.

A common approach to testing a server is to perform browser or client recording of a browser session. Recording of a browser session generally involves starting a browser session and making requests to a server. All of the outgoing HyperText Transfer Protocol (HTTP) messages are recorded and the status of the request and the contents of what was requested will be displayed. One problem, however, with client recording of a browser session is that it does not accurately simulate the real-world case where a plurality of clients are sending requests to the server. Although several copies of the single browser session may be played back simultaneously to simulate a plurality of clients, this can lead to a shut down of the operating system due to thread limitations well before a realistic number of clients can be simulated. More importantly, the timing of a client recorded single browser session is not accurate or realistic because only copies of a single browser session are being played back. In addition, critical server information such as the number of open sockets, when the sockets are closed, the state of a request (i.e., where a HTTP server is with regard to processing the request), when the HTTP server began to process the request and information and possible storage of a request that caused the server or HTTP service to shutdown prior to request processing are not available. Thus, client recording completely fails to capture a great deal of server information, including the important server information listed above.

Accordingly, there exists a need for a network simulation system that tracks critical server information and provides accurate and realistic simulation of real-world network sessions. In addition, this network simulation system would realistically simulate a large number of clients sending requests to the server, capture important information about those requests and provide accurate timing of requests made to the server. Whatever the merits of the above-mentioned systems and methods, they do not achieve the benefits of the present invention.

SUMMARY OF THE INVENTION

To overcome the limitations in the prior art as described above and other limitations that will become apparent upon reading and understanding the present specification, the present invention is a system and method for recording and playing back computer network characteristics. In particular, the present invention records the network characteristics on a server and plays back the recorded characteristics on a client. This arrangement provides accurate and realistic simulation of computer network characteristics that can be used for a variety of purposes (such as capacity planning and network troubleshooting). The present invention allows the recorded characteristics to be scaled to provide intensive testing of the capacity and resource limits of a network server. Further, the present invention permits a recording server to record multiple clients and playback that recording on a single machine (in order to simulate multiple clients).

The present invention also provides a record of network characteristics that are not captured in server log files (such as bad requests from a client). The present invention collects more accurately the network characteristics being receive by a server and provides more data on these network characteristics than other systems and techniques. This network characteristics data may be used, for example, to analyze customer usage patterns and the flow of requests to a network system (such as a World Wide Web site). By providing server recording of network characteristics, the present invention provides more accurate, detailed and realistic simulation of a real-world network and captures a greater amount of data than other systems and techniques (such as those systems and techniques that record on a client).

The system of the present invention generally includes a recording module that resides on a server and records and stores the network characteristics associated with networks sessions in a data collector file. A playback module that resides on a client receives the data collector file and plays back the data collector file upon request. The data collector file, which may be played back faster or slower to simulate more intensive or less intensive network session characteristics, includes a log file and a data file. The log file is used to store header information received from a client during recording and the data file is used to store other data. The recording module also includes a registration module, for registering the recording module with the server operating system, a tracking module, for tracking users, and a log restriction/rolling module for taking action to prevent the recorded data from filling the available storage space on a server. In particular, log rolling allows a user to preserve data by moving captured data to another machine without any loss of current data being received by the server.

The present invention also includes a method for recording computer network characteristics on a server and playing back those characteristics on a client. The recording method of the present invention includes using a global filter residing on the server to record the network characteristics. Recorded information is stored in a data collector file that includes a log file and a data file. The playback method includes receiving a data collector file containing recorded network characteristics and playing back the data collector file to simulate the characteristics of a real-world network session. Further, the playback method includes varying the playback speed and multiplying the number of recorded users (or repeating the same recording a number of times if only one user was recorded) to vary the intensity of the recorded network characteristics.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

The present invention is embodied in a system and method for recording computer network characteristics of network sessions on a server and playing back the recording on a single client machine or several client machines. Unlike existing network simulation systems that use manufactured static scripts that are continuously looped, the present invention provides an actual real-world dynamic recording of network sessions in a production environment that may be played back in a controlled test environment. The present invention accurately simulates the chaos and other characteristics that are present in real-world network sessions and provides a more detailed and realistic simulation in which to test a server.

II. Exemplary Operating Environment

Figure 1:
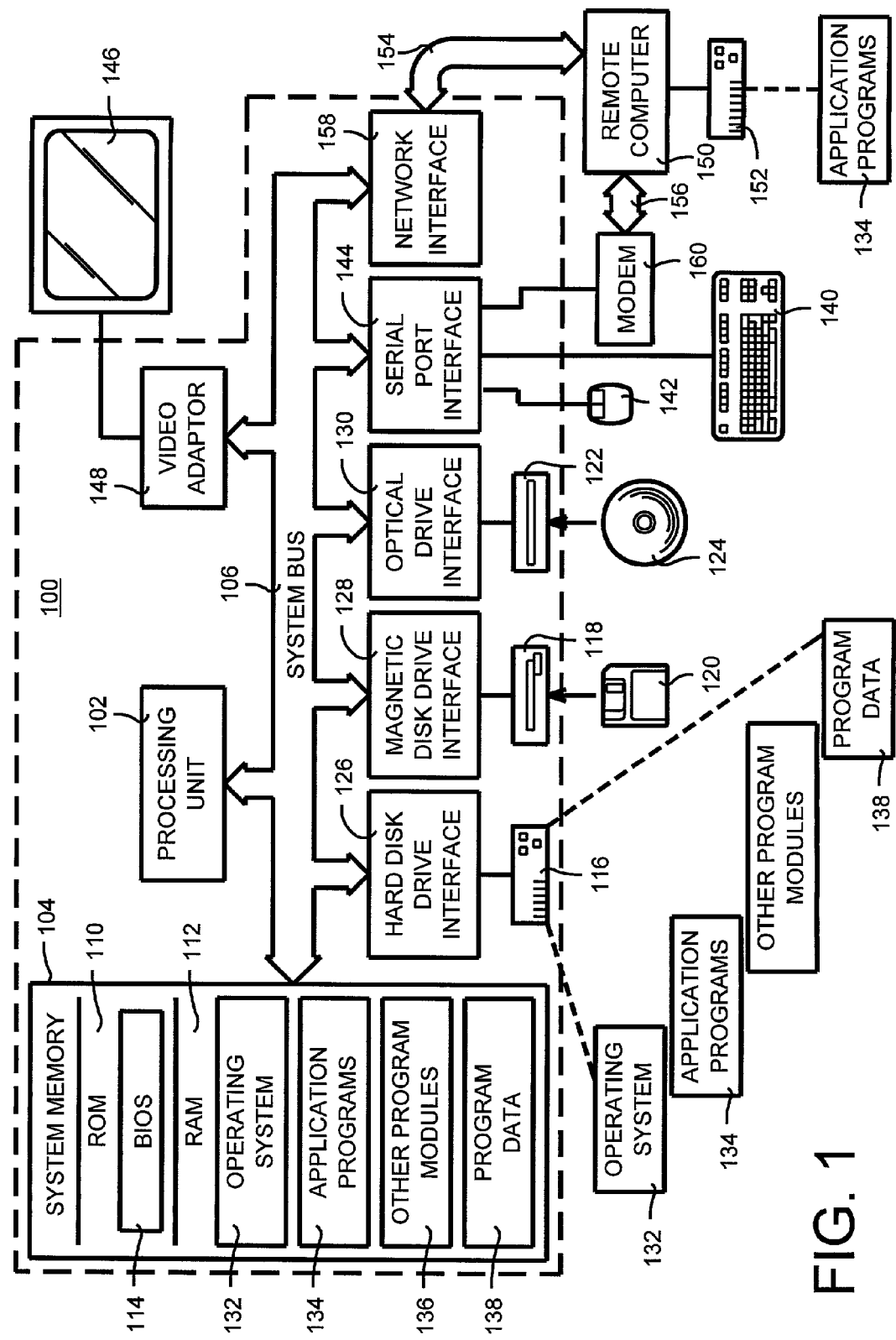
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system (BIOS) 114, containing the basic routines that help to transfer information between elements within the personal computer 100, such as during start-up, is stored in ROM 110. The personal computer 100 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD-ROM or other optical media. The hard disk drive 116, magnetic disk drive 128 and optical disk drive 122 are connected to the system bus 106 by a hard disk drive interface 126, a magnetic disk drive interface 128 and an optical disk drive interface 130, respectively. The drives and their associated computer-readable media provide nonvolatile storage of computer readable instructions, data structures, program modules and other data for the personal computer 100.

Although the exemplary environment described herein employs a hard disk, a removable magnetic disk 120 and a removable optical disk 124, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136 and program data 138. A user (not shown) may enter commands and information into the personal computer 100 through input devices such as a keyboard 140 and a pointing device 142. Other input devices (not shown) including, for example, a microphone, joystick, game pad, satellite dish, camera, scanner, or the like may be connected to the personal computer 100. These other input devices are often connected to the processing unit 102 through a serial port interface 144 that is coupled to the system bus 106, but may be connected by other interfaces, such as a parallel port, a game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and the Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device 152. It will be appreciated that the network connections shown are exemplary and other means of establishing a communications link between the computers may be used.

III. General Overvi w

As shown in FIGS. 2–8 for the purposes of illustration, the invention may be embodied in a system and a method for a system for recording network sessions on a server and playing back the recording on a client machine. The recording includes detailed information about the network session (such as timing, user and socket information) that provides an accurate and realistic network simulation that is not available with simulation systems that use client recording and manufactured static scripts. The dynamic real-world recording of network sessions created by the present invention may be played back in a controlled testing environment to test, for example, the capacity and performance of a server prior to its actual deployment in a production environment.

In addition to capacity planning, the present invention has other uses and applications in a networking environment. By way of example and not limitation, the present invention may be used to test an operating system (such as Internet Information Server (IIS)). This testing may be performed by installing the present invention on a server, recording data and playing back the recorded data to reproduce any errors encountered. The present invention may also be used to ensure that a new version of an operating system will operate properly prior to actual use. This would provide a customer with a confidence that the customer's network would run smoothly using the new version. For example, if a customer is using version 3.0 of an operating system and would like to upgrade to version 5.0, the present invention may be used to record live requests on the customer's network that is running version 3.0, setup a mirrored network that is running version 5.0, and playback the recording on the mirrored network to verify that version 5.0 would be stable (and be, for example, faster with better memory management). The present invention may also be used to migrate a user from one operating system to another using a technique similar to the technique mentioned above. Moreover, the present invention may be used to stress test a network so that the capabilities and limits of a network system may be determined.

The data files created by the record module of the present invention may also be used to perform detailed analysis. Because the data files created by the record module capture detailed information about the network (such as network traffic), significant aggregate information may be gained by analyzing these data files.

Figure 2:
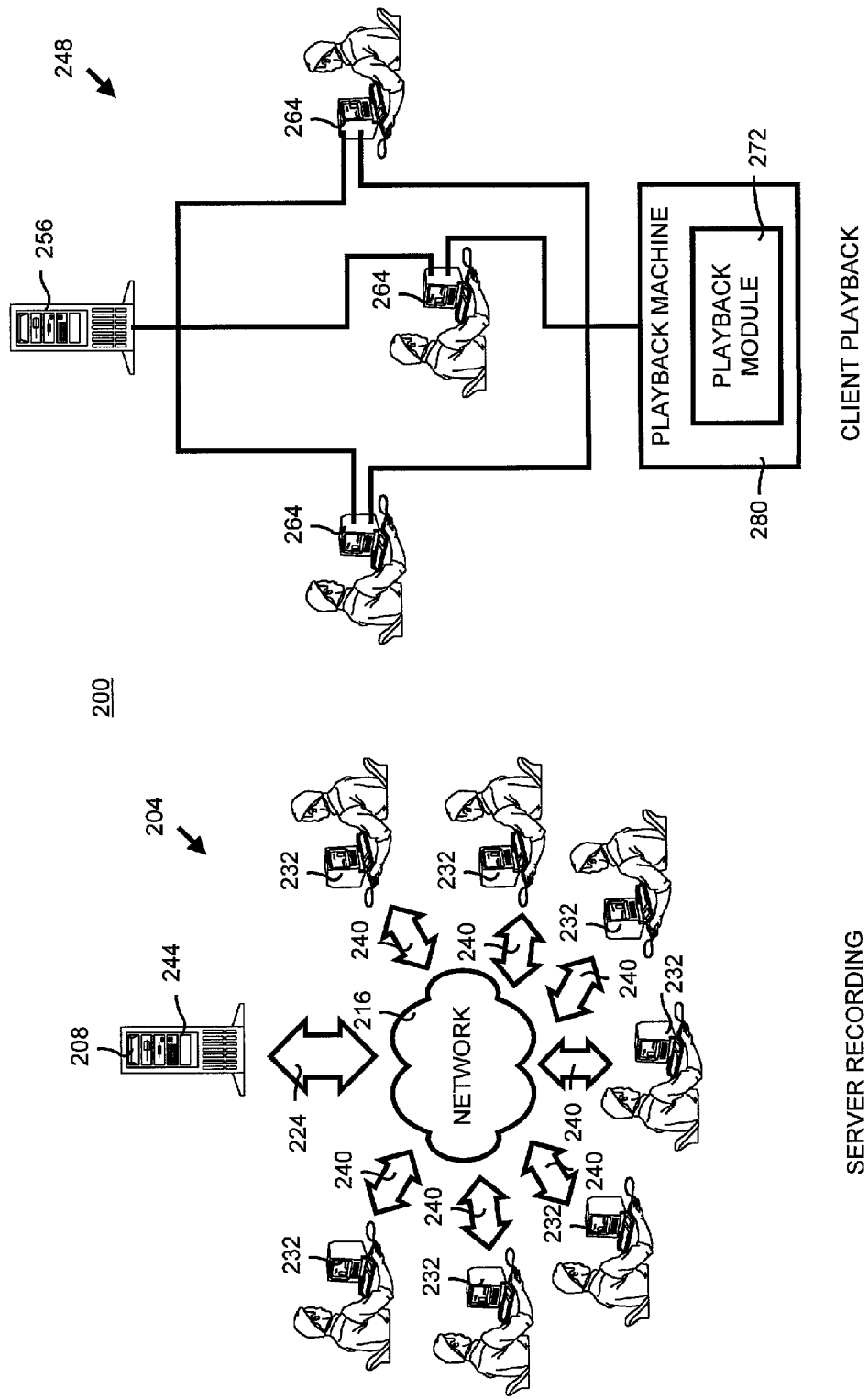
FIG. 2 is an overall block diagram of two computer networks incorporating the network simulation system of the present invention.

FIG. 2 is an overall block diagram of two computer networks incorporating the network simulation system 200 of the present invention. The computer networks illustrated are only examples of several types of computer networks that could incorporate the network simulation system of the present invention. In general, the network simulation system of the present invention includes both recording on a server and a playback on a client.

Server recording preferably occurs in a production environment on a wide area network (WAN) 204. The WAN 204 includes a recording server 208 having server operating system and connected to a network 216 via a network connection 224. In a production environment, real network sessions and requests arriving at the recording server 208 may be recorded. A plurality of WAN client machines (or clients) 232 are also connected to the network 216 via their respective network connections 240. At any given time, the number of WAN clients 232 connected to the recording server 208 over the network 216 may vary. For example, the recording server 208 may be a Web server that has users accessing the site over the Internet. The number of users accessing the site may range from zero to the maximum number of connections that the Web server can accommodate.

Server recording in the present invention is performed by a record module 244. The record module 244 resides on the recording server 208 and records requests transmitted by a WAN client 232 to the recording server 208. These requests generally are to access a page contained on the recording server 208. In general, the record module 244 records request made by the WAN client 232 and stores these requests in a data collector file.

Client playback of a recording made by the recording server 208 preferably occurs in a test environment on a local area network (LAN) 248. The LAN 248 includes a testing server (a server being tested) 256 that is in network communication with LAN clients 264. In a test environment, the realistic simulation provided by the network simulation system 200 may be used to test and tune the testing server 256 to achieve optimal performance prior to introducing the testing server 256 into a production environment. Moreover, the network simulation system 200 may be used to test additional software that runs on the testing server 256 or custom applications written for the testing server 256. Although three LAN clients 264 are illustrated, the number of LAN client may be one or more. A playback machine 272 is in communication with the LAN clients 264. The playback machine 272 may be one of the LAN clients 264 or a separate machine having a processor.

A playback module 280 resides on the playback machine 272 and performs the playback of a recording made by the record module 244 of the present invention. In particular, the playback module 280 reads individual records from a data collector file (containing requests recorded by the record module 244) and sends these records to the LAN clients 264. As explained in detail below, each individual record is assigned to a LAN client 264. Each LAN client 264 then transmits a recorded request to the testing server 256, thereby realistically and accurately simulating a production environment. In addition, each LAN client 264 is capable of playing back a recording made by the record module 244 that includes, for example, requests from multiple LAN client 264. Thus, each LAN client 264 is capable of simulating multiple recorded client during playback.

Figure 3:
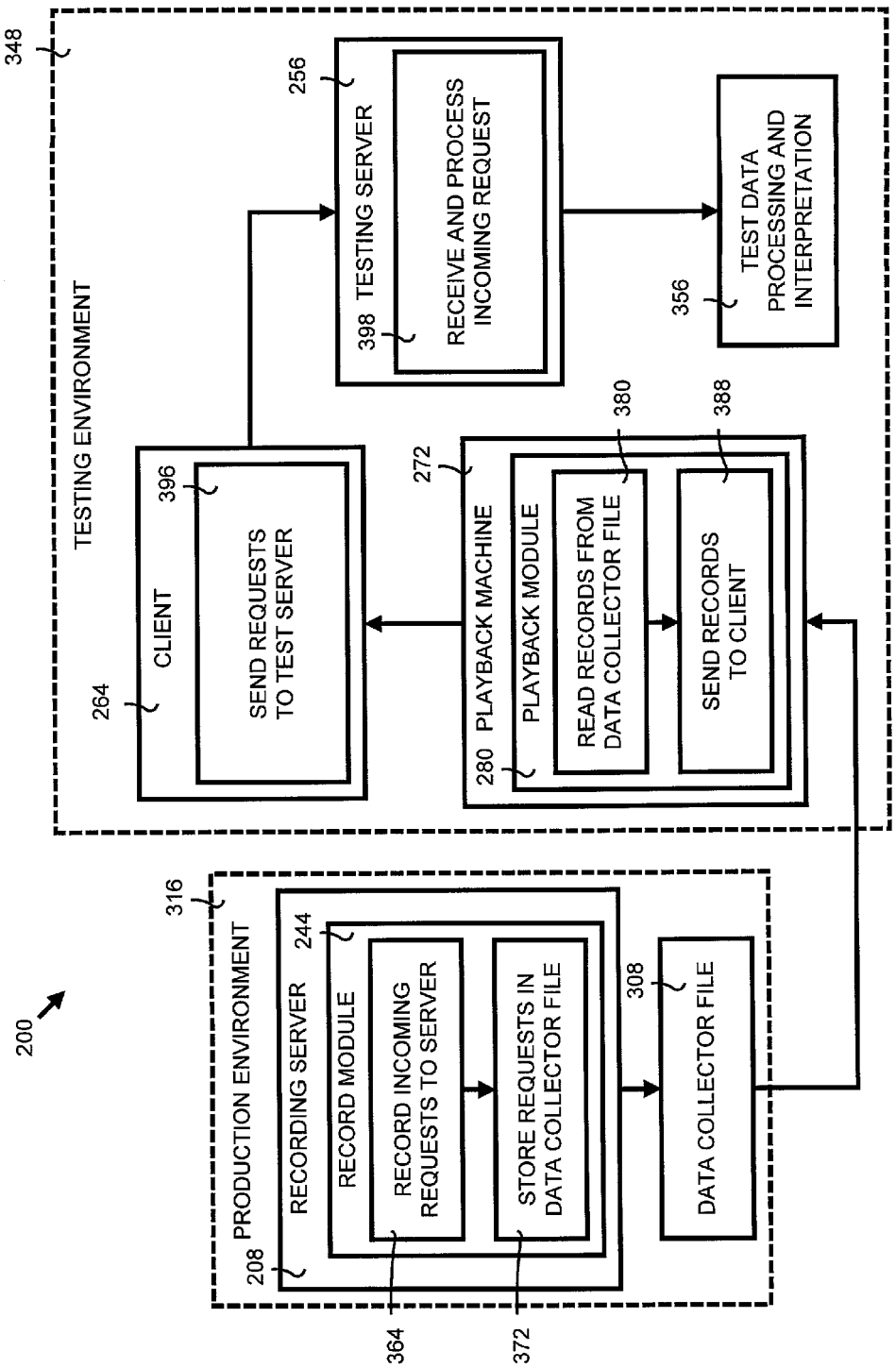
FIG. 3 is a general block-flow diagram illustrating the network simulation system shown in FIG. 2.

FIG. 3 is a general block-flow diagram illustrating the network simulation system shown in FIG. 2. In general, network simulation system records network requests to a server within a production environment, stores the requests in memory and plays the recorded requests back on a client in a testing environment. Specifically, the network simulation system 200 of the present invention includes a recording server 208 and a data collector file 308 within a production environment 316. The production environment is preferably one in which the recording server 208 receives real-world requests from a plurality of outside users. Although a preferred embodiment the recording server is in a production environment and records real-world requests, alternate embodiments may be implemented.

The network simulation system 200 of the present invention also includes a playback machine 272, reading data recorded by the recording server 208, at least one client 264, for sending requests to a testing server 256, and the testing server 256, for processing the requests sent by the client 264. These machines occupy a testing environment 348 whereby the testing server 256 may be tested and evaluated. The data (such as performance and capacity data) collected during the simulation testing of the testing server 256 may be sent for further processing and interpretation (box 356).

The record module 244 resides on the recording server 208 and records requests that are received by the recording server 208 (box 364). These requests are stored (box 372) by the record module 244 in the data collector file 308. The playback module 280, which resides on the playback machine 272, read individual records (box 380) from the data collector file 308 and sends each record (box 388) to at least one client 264. The client 264 sends the requests (box 396) to the testing server 256, which receives and processes the incoming requests (box 398).

IV. System and Op rational Details

As discussed above, the network simulation system of the present invention includes a record module, for recording network sessions on a recording server, and a playback module, for playing back the recording on a client. The structure and operation of each of these modules will now be discussed. Although the network simulation system of the present invention will be described as containing multiple modules, other embodiments are possible that implement the described functionality of the invention differently. By way of example and not limitation, these differences include having a different number of modules, having a different arrangement of modules and having different modules than those described (including having a single, monolithic module having the functionality of all the modules).

Record Module

Structural Overview

Figure 4:
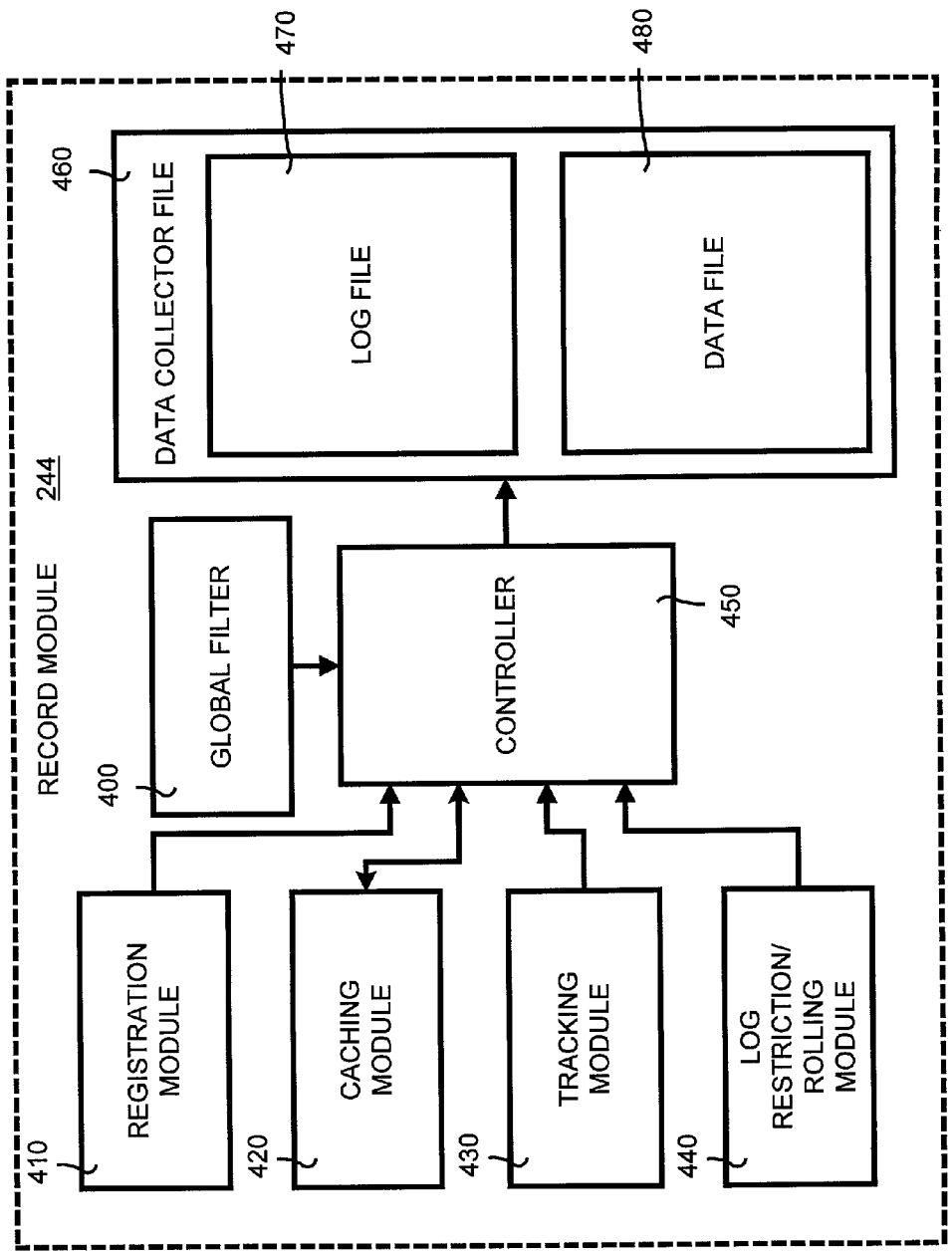
FIG. 4 is a detailed block diagram illustrating the record module of the network simulation system shown in FIG. 3.

FIG. 4 is a detailed block diagram illustrating the record module of the network simulation system shown in FIG. 3. Generally, the record module 244 records requests received by the server on which the record module 244 resides and stores these requests along with other information. The record module 244 includes a global filter 400 that captures data received by the server. The global filter 400 is notified of certain events by the server operating system (such as Internet Information Server (IIS)). For example, the server operating system listens for a request to be received and, when it occurs, the global filter 400 is notified and begins capturing the data from a host environment. A host environment can be, for example, an operating system, a network operating system, an application designed to run on top of an operating system, a technology that is part of an operating system (such as IIS) and a group of technologies on the computer.

In order to be notified of these events the record module 244 must register with the server operating system. The record module 244 includes a registration module 410 that registers with the server operating system and informs the operating system for which events to notify the record module 244. Further, the record module 244 includes a caching module 420 that caches the data sent by the global filter 400. A tracking module 430, which is also included in the record module 244, tracks specific network information that is needed by the network simulation system and that the user may desire to track. For example, the tracking module 430 is capable of keeping track of which client sent a certain request and at what time the request was received by the server.

Another module included in the record module 244 is a log restriction/rolling module 440, which is capable of limiting the size of the file that stores the recorded data. The log restriction/rolling module 440 achieves this by either deleting the file or moving the data to another machine to preserve captured information. The record module 244 also includes a controller 450, for processing and providing control to the record module 244, and a data collector file 460, for storing the data collected by the global filter 400. The data collector file 460 includes a log file 470, for storing header and tracking information, and a data file 480, for storing other types of data.

Figure 5:
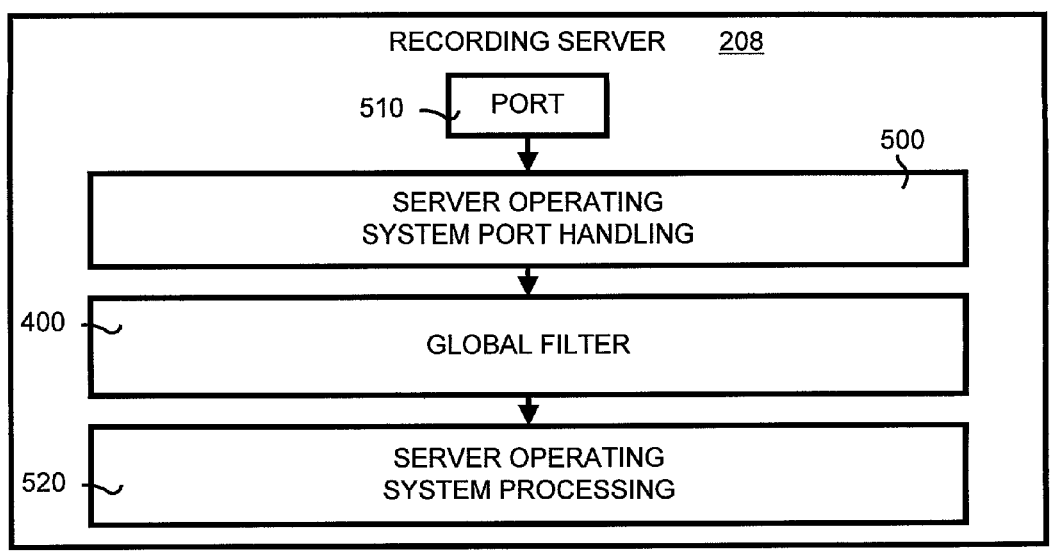
FIG. 5 is a block diagram illustrating an example implementation of the global filter shown in FIG. 4.

FIG. 5 is a block diagram illustrating an example implementation of the global filter shown in FIG. 4. In particular, the global filter 400 of the present is shown implemented into the server operating system on the recording server 208. The global filter 400 is implemented between a port handling module 500 of the server operating system, which scans a port 510 for incoming requests, and a processing module 520 of the server operating system. In order to capture raw data from the port 510, the filter should be global. Other types of non-global filters may be used on a per site basis. For example, if there are multiple sites residing on the recording server 208 then multiple non-global filters may be set up for each site. However, the global filter 400 must also be used because it captures requests for all sites residing on the recording server 208. This feature is desirable because all of the requests received by the recording server 208, regardless of the site being requested, should be recorded.

Operational Overview

Figure 6:
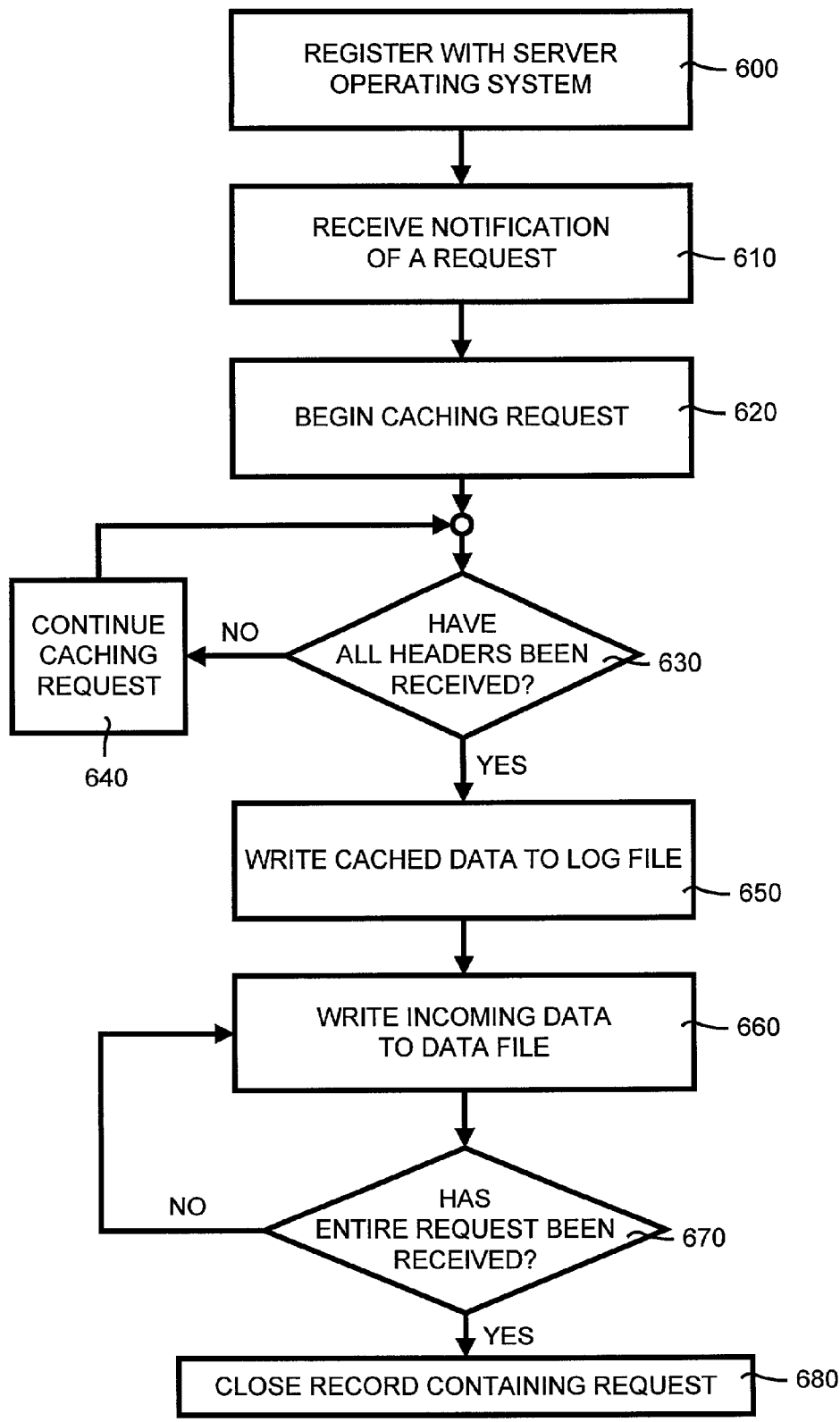
FIG. 6 is a detailed flow diagram of the operation of the record module shown in FIG. 4.

FIG. 6 is a detailed flow diagram of the operation of the record module shown in FIG. 4. Prior to receiving data from the recording server, the record module must register with the server operating system (box 600). As described below in a working example, there are several notifications that the record module can receive from the server operating system. As a request arrives at the recording server, the server operating system notifies the record module that there is a request incoming (box 610). The global filter then captures raw data being received by the recording server over the port.

The record module queries a high-performance hardware counter (such as a high-resolution system clock) that preferably has a resolution at least in the pico-seconds range. This type of hardware counter is found frequently on newer computers. This hardware counter is used to order the raw data within the log file by time-stamping precisely when the raw data was received by the record module.

The record module then begins to cache the raw data from the request (box 620). Memory is allocated to create a cache and headers of the request are cached. In general, header information from the request is to be written to the log file while the body of the request is written to the data file without being cached. A header can be a unit of information that precedes a data object (such as is in the body of the request). However, there is the possibility that the full request will not be sent as a single unit by the server operating system, and the entire request may be received in several units spread over time. Although most requests will be a manageable size (such as a few hundred bytes), other requests may be larger and the operating system may not be able to send all the packets of the entire request together. Moreover, the recording server may have other priorities with other clients (such as uploading a large file) and this may cause the request to be sent to the record module in several portions. When a request is received in several portions, it is possible that each portion will have a header section. Further, the body of the request, when it is transmitted, may also arrive in multiple portions, and each portion of the body is written directly to the data file. The request is cached until all the headers for that request are received in order to separate the header section from the body of the request, piece the header back together and write the header information to the log file and the data within the body of the request to the data file. Thus, the request is cached until the end of the headers is reached.

The headers are cached for at least two reasons. First, the invention is capable of determining whether the request is a duplicate request (as often happens during a Windows® NT® LAN Manager (NTLM) type authentication. Second, the invention is capable of ensuring that information used to uniquely identify a user (discussed below) is completely in memory.

A determination of whether the end of headers has been reached is made (box 630). If all of the headers have not been received, then the record module continues caching the request (box 640). If all of the headers from the request have been received, the record module pieces the header information together and writes that information into the log file (box 650).

Immediately after all of the headers have been received the record module searches for a special "cookie." In general, a cookie can be a small text file that can contain information or a small piece of information about the client, its user and the user's preferences. The cookie that the record module searches for is a special cookie that was placed there by the record module in order to identify a user making multiple requests to the server. Each cookie contains at least a unique value (such as a globally unique identifier (GUID)) to provide identification for the user. If the cookie does not exist in the request then a unique value is assigned to the cookie and the unique value is stored as part of the request in the log file. If the request includes a cookie, the unique value corresponding to the cookie is located and the unique value is stored as part of the request in the log file. This is how the recording module tracks users.

When the recording server sends back a response to the requesting client the cookie is also returned with instructions to include the cookie with subsequent requests. The requesting client then knows that it must send a cookie every time it makes a request to the recording server. Further, an expiration time may be set on the cookie so that the cookie will last only as long as the user is logged on.

One advantage of tracking users in this manner is that recording can be done across a network cluster. In other words, users can be tracked across a cluster of multiple recording servers. If, for example, during a user's set of transactions, the user's requests are moved or forwarded to multiple recording servers the unique value assigned to the user will permit the multiple recording servers to record and uniquely identify the user. After recording, postprocessing can be performed on the log file of each of the multiple recording servers in the cluster to generate a single log file containing all of the requests made by a specific user in chronological order Alternatively, instead of creating a single log file the log files of the multiple recording servers may be merged during playback by the playback module.

The recording module also keeps track of whether the request is from a new socket or an open socket. A socket can be a software object that connects an application to a network protocol. For example, a browser can open a socket that enables it to send and receive messages by reading and writing data to and from the socket. A global socket counter is maintained and every time a request is made the global socket counter is advanced. In addition, a per socket request counter is maintained so that during playback the order and socket that the request was received on can be determined. Thus, the per socket request counter tracks and logs the socket number and the number of times that particular socket has been accessed. Further, when a socket is closed the socket number and the unique value associated with that socket number are tracked and logged along with the time.

Another feature of the recording module is that a server status code is tracked for each request. When the server status code cannot be determined (such as during the writing of the body of the request to the data file) a status value (such as—1) is entered in the server status code field. When the correct server status code becomes available the status value is overwritten by the correct server status code. This feature is useful for troubleshooting the network. For example, if the server operating system fails unexpectedly the request that caused the failure can be found by searching the log file for the status value. The earliest request that has a status value written in the server status code field is likely the request that caused the failure, and at a minimum indicates the area where the request that caused the error resides.

Once all of the headers have been received the record module then begins writing the body of request and other incoming data from that request to the data file (box 660). The record module then determines if all of the data from the request has been received (box 670). If not, then the further incoming data is written to the data file. Otherwise, the record for that request is closed within the data file (box 680).

An optional feature that may be included on the record module is log file rolling and termination. Recording of the requests being received by the recording server can occupy large amounts of memory and can impose serious burdens on the memory storage capabilities of the recording server. The log restriction/rolling module 440 provides an option to the user that allows the user to specify a time limit and a size limit on the data collector file to preserve memory resources. The file may either be deleted or closed and moved to another storage area (such as another machine or another hard drive).

Playback Module

Structural Overview

In general, the playback of the present invention plays back on a client machine a recording made on a recording server. The playback module allows a single client to simulate multiple clients by playing back a recording of multiple client on the single client. Further, the requests contained on the recording may be "time-compressed" so that playback speed is increased. Speeding up playback may be used to stress the server being tested and determine its limits.

Figure 7:
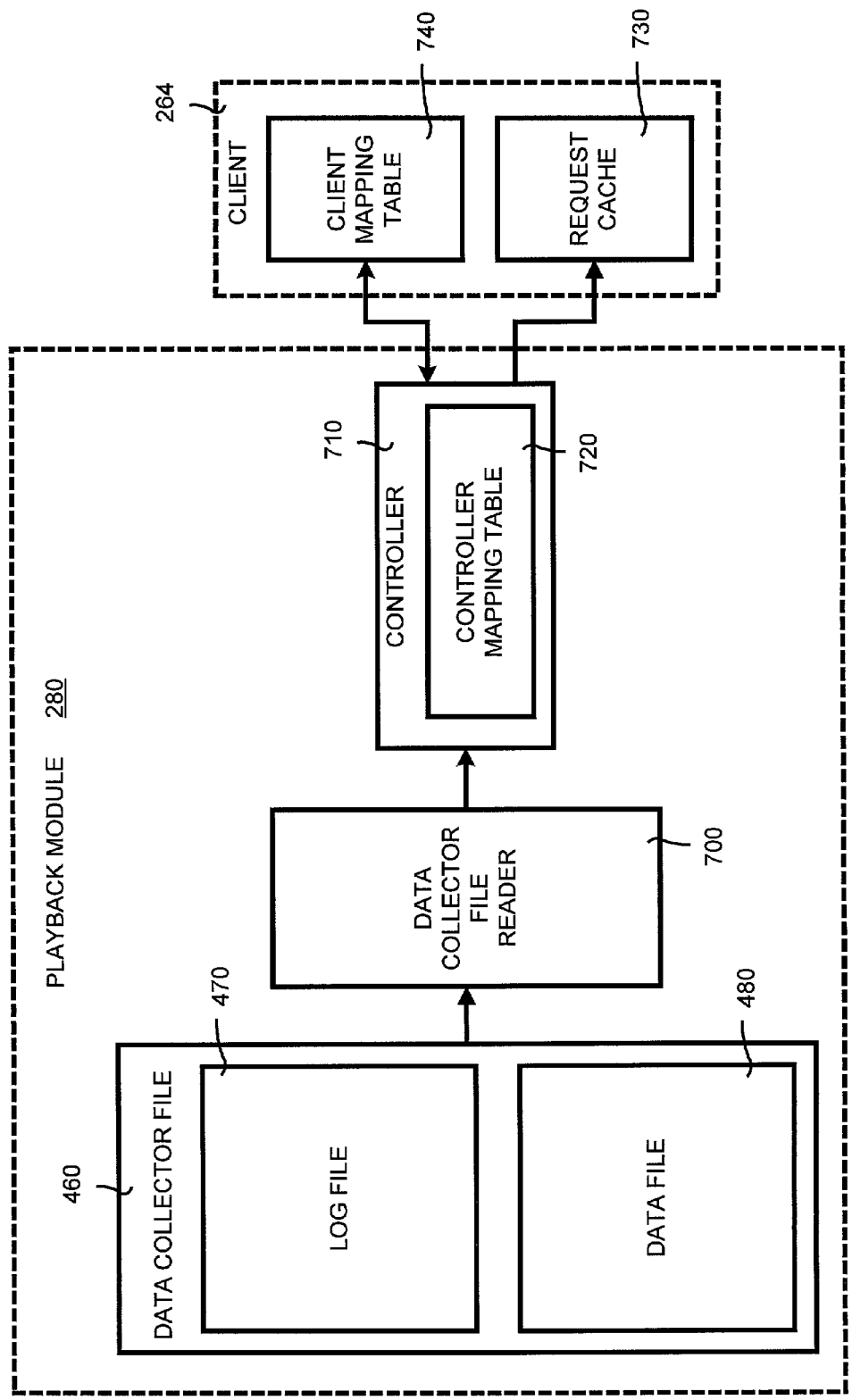
FIG. 7 is a detailed block diagram illustrating the playback module of the network simulation system shown in FIG. 3.

FIG. 7 is a detailed block diagram illustrating the playback module of the network simulation system shown in FIG. 3. The data collector file 460, which includes the log file 470 (containing header and tracking information) and the data file 480 (containing request data), is accessed by a data collector file reader 700. The data collector file reader 700 is a tool that reads a single record from the data collector file 460 and passes the record to a controller 710. The controller 710 includes a controller mapping table 720 to determine which client should be sent a specific request. As noted above, using the network simulation system of the present invention a single client can simulate multiple users.

The controller 710 sends requests to the client 264 until the request cache 730 of the client 264 is either filled or the controller 710 runs out of data. In addition, a client mapping table 740 is maintained on the client 264 for use in determining when a user has not made a request for a period of time. This information may be used to time out a user in order to free the resources used by the client machine in simulating that user. Timing out a user can mean that the user is removed from a list (such as a mapping table) after a period of inactivity. Both the controller mapping table and the client mapping table are preferably hash tables that contain the necessary mapping information.

Operational Overview

Figure 8:
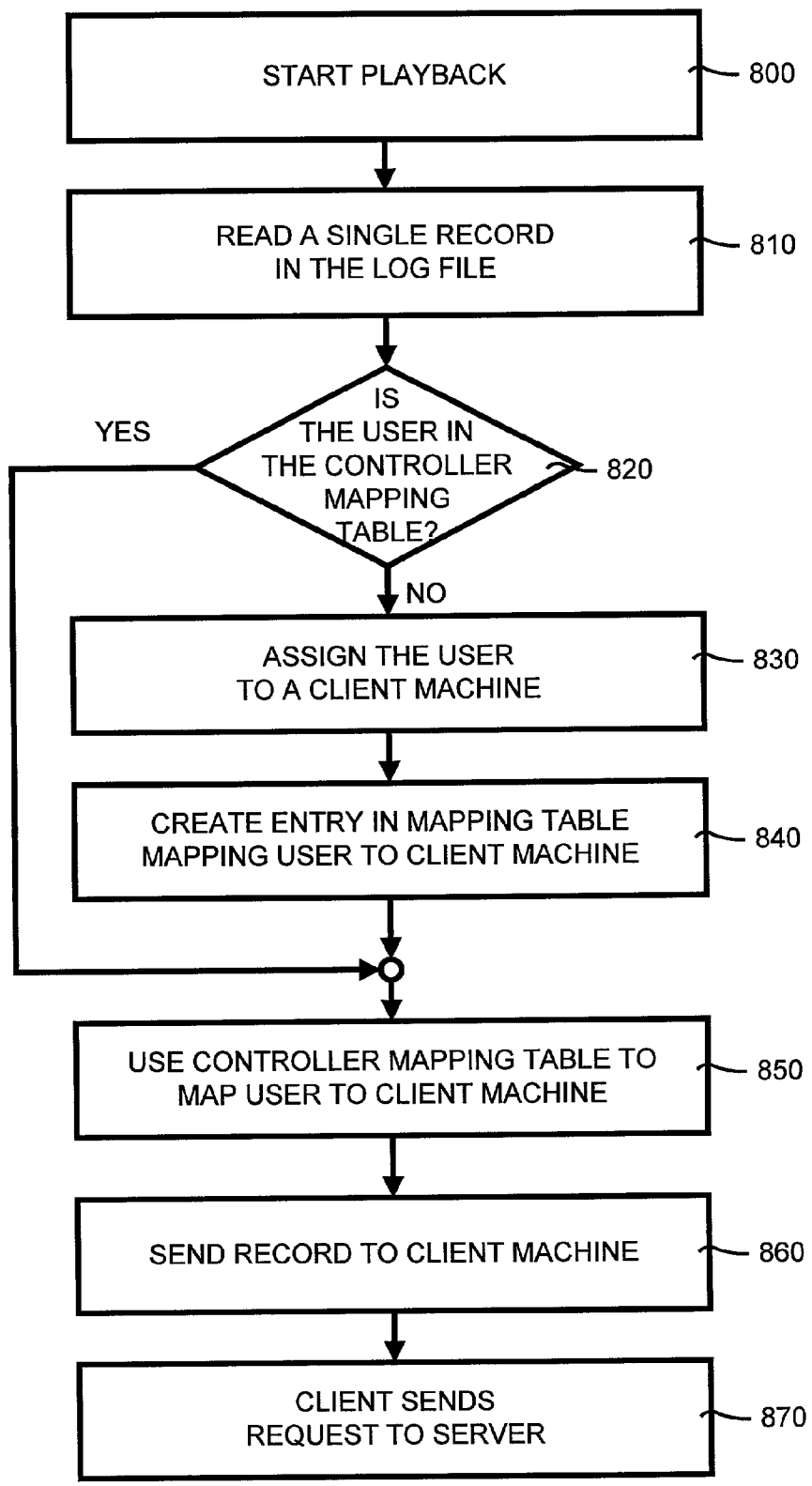
FIG. 8 is a detailed flow diagram of the operation of the playback module shown in FIG. 7.

FIG. 8 is a detailed flow diagram of the operation of the playback module shown in FIG. 7. At the start of playback (box 800) the data collector file reader 700 begins reading a single record from the data collector file 460 (box 810). The playback module 280 then determines, by reading the unique value (such as a GUID) which user sent the request contained in the record. When the user is established, the playback module 280 determines whether the user is in the controller mapping table 720 (box 820).

The controller mapping table 720 maps a user to a client machine. This is necessary to avoid the situation where more than one machine is playing back requests from the same user. For example, many HTTP servers keep state information on users (based on some cookie value) thus necessitating that recordings made by the present invention be played back on the same client machine. The controller mapping table 720, which is preferably a hash table, takes into account the number of client machines available and then generates a table that assigns a client machine to a particular user. All requests from this user are sent to that specific client machine. One advantage this feature provides is automatic load balancing between the client machines. This allows playback to be more efficient and improves the fidelity of the playback to the original recording.

If the user is not in the controller mapping table 720, the playback module 280 assigns the user to a client machine (box 830). An entry in the controller mapping table 720 is then created that maps the user to their associated client machine (box 840). After a user mapping is present the controller mapping table 720 is used to map the user to the associated client machine (box 850). The controller 710 sends the record to the request cache 730 of the client 264 (box 860) and keeps adding to the request cache 730 of the client 264 even while the client 264 is playing back. After receiving a notification to start from the controller 710 the client 264 begins sending request to the testing server 256. After the client has played back the data in the request cache 730 the data may either be discarded or overwritten by incoming data. When the end of the data collector file 460 is reached the controller 710 sends out an end of data file message to the clients.

Users who have not made a request for a period of time (or users who have "timed out") are determined dynamically by the playback module 280. In particular, the controller 710 examines the client mapping table 740 at a regular interval to determine whether a request has been made by a user within the time period. The client mapping table 740, which is preferably a hash table, maps a user to the time the last request was made by that user. Using the client mapping table 740, the playback module 280 can determine whether the user has made a request during a time period. If not, then the user is deleted from system. This feature increases system performance and preserves client resources. In addition, it is more efficient to keep track of users who have timed out on the client machines rather than the server, because the server is not slowed down and it is less costly to acquire more clients rather than servers.

The playback module 280 also closes sockets when instructed to by the data collector file 460. Although socket closure is tracked by the recording server 208 and not determined dynamically during playback, any time a notification of socket closure that was recorded on the recording server 208 is received by the playback module 280 that socket is closed.

V. Working Example

The following working example is only one exemplary illustration of how the present invention may be implemented. Those skilled in the art will recognize that several other implementations of the present invention are possible. In this working example, the system and method of the present invention uses a global filter to record request received by an Internet Information Server (IIS) server and play the recording back against the same or another IIS server. The global filter is capable of recording a request from any IP address and any virtual directory to the IIS server.

In this working example, an Internet Server Application Program Interface (ISAPI) global filter was used on a recording server to record network characteristics. The ISAPI global filter was implemented into IIS between the IIS port handling and the IIS processing layers. The filter registered as a medium with IIS so that the filter got called after any ISAPI dynamic link libraries (DLLs) that were registered as a high. For requests received, objects, registered as a high get called first by IIS, then those registered as medium are called, and so on. For request being sent out the objects are called in reverse order. One example of an ISAPI DLL that may register as a high is SSL. By registering as a medium with IIS the ISAPI global filter of the present invention received the raw data after SSL had decrypted the data.

When the ISAPI global filter registered itself with IIS, several features were enabled so that IIS notified the filter upon the occurrence of certain events. In this example, the filter registered to be notified whether the request came from a secure or non-secure port. Requests from a non-secure port have a certain port number associated with the request. Similarly, requests from a secure port (such as a Secure Socket Layer (SSL) or a Secure HyperText Transfer Protocol (S-HTTP) request) have another number associated with them. The filter also registered to be notified when raw data arrived at a port (either secure or non-secure). Because of the way the ISAPI global filter was implemented into IIS the ISAPI global filter actually got called before IIS began processing the data. This feature can be useful for troubleshooting the network because by examining the log file it can be determined at what time a network problem occurred and what request may have caused the network problem.

The ISAPI global filter also registered with IIS to be notified of server status codes, socket terminations, socket that were being opened and port numbers. When a request was received by IIS, the ISAPI global filter was notified and given the raw data from the port. The request was then cached until all of the header information was received. Then the header information was written to the log file. When all of the headers were received, the header information was time-stamped and written to the log file. The time stamps were relative to when IIS started. In addition, port number, socket number, client IP address and the server status code were also written to the log file.

After all the headers were received, the remainder of the incoming data was written to the data collector file. Two files were created: the log file, which holds the initial (or header) request data, and the data file, which holds any data beyond the initial request data. The format of the log file included the port the request was received on and the user identification. The user identification is a GUID that uniquely defines the user. In addition, the log file included the server IP address, the socket number the request as received on, the identification of the request made on a socket, the time the request was received and the server status code.

The body offset value (in relation to the rest of the request) was also written in the log file. If the body offset is a non-zero value this indicates that the data was received in more that one portion. The body offset is written at the end of the data and contains the offset to the next portion of data. The body offset is used so that if additional data associated with a certain request is received after the data is written it can be easily appended. In addition, during playback the data collector file reader can go easily piece together sections of data belonging to the same user. The data file format also includes an offset value and is written in a similar manner. When the recording was finished both the log and data files were closed and were ready for playback on a client machine.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A network simulation system for simulating network characteristics, comprising:
   a record module having a filter that resides on a server and records network characteristics;
   a data collector file that stores the recorded network characteristics for playback on a playback machine.

2. The network simulation system of claim 1, wherein the record module comprises a filter that captures network data from a host environment.

3. The network simulation system of claim 2, wherein the filter is a global filter.

4. The network simulation system of claim 2, wherein the filter is implemented into an operating system of the server.

5. The network simulation system of claim 4, wherein the filter is implemented between a port handling module, which scans a port for incoming network data, and a processing module, which processes the network data.

6. The network simulation system of claim 1, wherein the record module comprises a log restriction/rolling module that is capable of limiting a size of the data collector file that stores the recorded network characteristics.

7. The network simulation system of claim 6, wherein the log restriction/rolling module limits the size of the data collector file by at least one of: (a) deleting at least a portion of the data collector file; (b) moving at least of portion of the data collector file to another machine.

8. The network simulation system of claim 1, wherein the data collector file comprises a log file, which stores header and tracking information, and a data file, which stores other types of data.

9. The network simulation system of claim 8, further comprising a caching module that caches at least a portion of incoming network data and subsequently writes the cached data to the log file.

10. The network simulation system of claim 1, further comprising a playback module that resides on the playback machine and plays back the recorded network characteristics.

11. The network simulation system of claim 10, wherein the playback machine is a client and the recorded network characteristics are played back to a testing server.

12. The network simulation system of claim 10, wherein the playback module comprises a data collector file reader that reads at least a portion of the recorded network characteristics stored in the data collector file.

13. The network simulation system of claim 12, wherein the data collector file comprises a log file, which stores header information, and data file, which stores other network data.

14. The network simulation system of claim 11, wherein the testing server is connected to at least one other client and the playback module comprises a controller and a controller mapping table that determines to which client the testing server should send a played back request.

15. The network simulation system of claim 11, wherein the testing server is connected to at least one other client and each client comprises a client mapping table that is used to time out a user.

16. A network simulation system for playing back recorded network characteristics, comprising:
   a data collector file that contains network data that has been recorded by a filter that resides on a recording server; and
   a playback module that resides on a playback machine and plays back the data collector file;

wherein the network data is sent by the playback to a testing server to simulate network characteristics on the testing server.

17. The network simulation system of claim 16, wherein the network data includes header data and the data collector file comprises a log file, which stores he header data, and a data file, which stores the remainder of the network data.

18. The network simulation system of claim 16, wherein the playback machine is a client machine in communication with the testing server.

19. The network simulation system of claim 18, wherein the playback module comprises a data collector file reader capable of accessing the network data within the data collector file.

20. A method of simulating computer network characteristics on a testing server, comprising:
   recording network data using a filter residing on a recording server;
   storing the recorded network data; and
   playing back the recorded network data on a playback machine in communication with the testing server.

21. The method of claim 20, wherein recording comprises capturing the network data from a host environment of the recording server.

22. The method of claim 21, wherein recording further comprises caching the captured network data prior to storing the network data.

23. The method of claim 22, wherein the network data comprises header data and body data and network data is cached until all the header data has been captured.

24. The method of claim 20, wherein the network data comprises header data and body data and the recorded network data is stored in a data collector file comprising a log file, which stores the header data, and a data file, which stores the body data.

25. The method of claim 24, wherein the header data is cached until all of the header data has been recorded and the cached header data is stored in the log file.

26. The method of claim 24, wherein recording comprises assigning a unique value to each user in communication with the recording server to identify the user.

27. The method of claim 26, wherein the unique value is stored in the log file.

28. The method of claim 20, further comprising tracking network information from the recording server.

29. The method of claim 28, wherein the network information includes at least one of: (a) a user that sent a request; (b) what time a request was sent by a user; (c) when a socket was opened; (d) when a socket was closed; (e) a status code of the recording server.

30. The method of claim 20, wherein the playback machine is a client machine.

31. The method of claim 30, wherein the testing server is in communication with a second client and playing back comprises using a controller mapping table to assign a user to a client such that all recorded network data from the user is played back on the same client.

32. The method of claim 30, wherein the client machine can simulate multiple users by playing back the recorded network data.

33. A computer-readable medium having computer-executable instructions for performing the method recited in claim 20.

34. A network simulation system for recording network characteristics of a computer network, comprising:
   a record module located on a server on the computer network; and
   a custom-generated log file generated by the record module that stores the recorded network characteristics;
   wherein the custom-generated log file is not a server log file of the server.

* * * * *

UNITED STATES PATENT AND TRADEMARK OFFICE
CERTIFICATE OF CORRECTION

PATENT NO. : 7,013,251 B1  
APPLICATION NO. : 09/461900  
DATED : March 14, 2006  
INVENTOR(S) : Eric Nace et al.

It is certified that error appears in the above-identified patent and that said Letters Patent is hereby corrected as shown below:

In Figure 2, to left of "Playback Module", delete "280" and insert -- 272 --, therefor.

In Figure 2, to right of "Playback Module", delete "272" and insert -- 280 --, therefor.

In column 5, line 34, delete "Overvi w" and insert -- Overview --, therefor.

In column 7, line 43, delete "Op rational" and insert -- Operational --, therefor.

In column 9, line 42, delete "(as" and insert -- as --, therefor.

In column 15, line 6, in Claim 17, delete "he" and insert -- the --, therefor.

Signed and Sealed this

Eighteenth Day of August, 2009

David J. Kappos  
*Director of the United States Patent and Trademark Office*